(12) United States Patent
Gorokhov et al.

(10) Patent No.: US 8,204,530 B2
(45) Date of Patent: Jun. 19, 2012

(54) POWER CONTROL FOR WIRELESS COMMUNICATION SYSTEMS

(75) Inventors: Alexei Gorokhov, San Diego, CA (US); Aamod Khandekar, San Diego, CA (US); Tamer Kadous, San Diego, CA (US); Mohammad J. Borran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 829 days.

(21) Appl. No.: 11/761,267

(22) Filed: Jun. 11, 2007

(65) Prior Publication Data
US 2008/0014979 A1 Jan. 17, 2008

Related U.S. Application Data

(60) Provisional application No. 60/813,484, filed on Jun. 13, 2006.

(51) Int. Cl.
*H04Q 7/20* (2006.01)
(52) U.S. Cl. ....... 455/522; 455/69; 455/67.13; 370/329; 370/337
(58) Field of Classification Search .............. 455/522, 455/69, 67.13, 135, 88, 67.11, 130, 91, 436, 455/101, 103, 562.1; 370/332, 328, 329, 370/335, 325, 337, 252; 375/299, 267
See application file for complete search history.

(56) References Cited

U.S. PATENT DOCUMENTS

| | | | |
|---|---|---|---|
| 5,842,113 A * | 11/1998 | Nanda et al. ............ | 455/69 |
| 6,493,541 B1 * | 12/2002 | Gunnarsson et al. ........ | 455/69 |
| 6,859,445 B1 | 2/2005 | Moon et al. | |
| 7,139,274 B2 | 11/2006 | Attar et al. | |
| 2003/0156556 A1 * | 8/2003 | Puig-Oses et al. ........... | 370/328 |
| 2004/0219920 A1 * | 11/2004 | Love et al. ................. | 455/442 |
| 2005/0009551 A1 * | 1/2005 | Tsai et al. .................. | 455/522 |
| 2005/0037796 A1 * | 2/2005 | Tsai et al. .................. | 455/522 |
| 2005/0117549 A1 | 6/2005 | Kanterakis et al. | |
| 2005/0181834 A1 * | 8/2005 | Chen et al. ................ | 455/562.1 |

(Continued)

FOREIGN PATENT DOCUMENTS

JP 2004007030 1/2004

(Continued)

OTHER PUBLICATIONS

C30-20060327-023, "QUALCOMM Proposal for 3GPP2 Air Interface Evolution Phase 2", Dallas, TX, Mar. 2006.

(Continued)

*Primary Examiner* — Tan Trinh
(74) *Attorney, Agent, or Firm* — Donald C. Kordich

(57) ABSTRACT

Techniques for controlling transmit power of a terminal are described. The terminal may send a first transmission (e.g., for pilot or signaling) on the reverse link, receive feedback (e.g., a power control command or an erasure indicator) for the first transmission, and adjust a reference power level based on the feedback. The terminal may also receive interference information and possibly other parameters such as a pilot quality indicator (PQI), an offset factor, and a boost factor from a sector. The terminal may determine transmit power for a second transmission to the sector based on the interference information, the reference power level, and/or the other parameters. The terminal may receive the feedback from one sector and may send the second transmission with CDMA or OFDMA to the same sector or a different sector.

37 Claims, 8 Drawing Sheets

U.S. PATENT DOCUMENTS

| | | | | |
|---|---|---|---|---|
| 2005/0245278 | A1* | 11/2005 | Vannithamby et al. | 455/522 |
| 2005/0277419 | A1 | 12/2005 | Takano et al. | |
| 2006/0019694 | A1* | 1/2006 | Sutivong et al. | 455/522 |
| 2006/0262840 | A1* | 11/2006 | Wang et al. | 375/221 |
| 2006/0293074 | A1* | 12/2006 | Bottomley et al. | 455/522 |
| 2007/0010277 | A1* | 1/2007 | Sato et al. | 455/522 |
| 2007/0049280 | A1* | 3/2007 | Sambhwani et al. | 455/442 |
| 2007/0077956 | A1* | 4/2007 | Julian et al. | 455/522 |
| 2007/0140174 | A1* | 6/2007 | Proctor, Jr. | 370/332 |
| 2007/0201405 | A1* | 8/2007 | Santhanam | 370/335 |
| 2007/0218915 | A1* | 9/2007 | Yang et al. | 455/450 |
| 2007/0238480 | A1* | 10/2007 | Lin et al. | 455/522 |
| 2007/0287487 | A1* | 12/2007 | Puig-Oses et al. | 455/501 |
| 2008/0037664 | A1* | 2/2008 | Yang et al. | 375/260 |
| 2008/0056180 | A1* | 3/2008 | Li et al. | 370/329 |
| 2008/0117849 | A1* | 5/2008 | Borran et al. | 370/311 |
| 2008/0119215 | A1* | 5/2008 | Ji et al. | 455/522 |
| 2008/0214197 | A1* | 9/2008 | Englund et al. | 455/450 |
| 2008/0242337 | A1* | 10/2008 | Sampath et al. | 455/522 |
| 2009/0023466 | A1* | 1/2009 | Sutivong et al. | 455/522 |
| 2009/0262670 | A1* | 10/2009 | Cho et al. | 370/280 |

FOREIGN PATENT DOCUMENTS

| | | |
|---|---|---|
| JP | 2004248306 | 2/2004 |
| JP | 2004529530 | 9/2004 |
| JP | 2004312771 | 11/2004 |
| WO | WO02065667 | 8/2002 |
| WO | 03039042 | 5/2003 |
| WO | WO2005034383 | 9/2004 |
| WO | WO2005011145 | 2/2005 |
| WO | 2006007318 | 1/2006 |
| WO | 2006099545 | 9/2006 |

OTHER PUBLICATIONS

C.S0024-B, "cdma2000 High Rate Packet Data Air Interface Specification", May 2006.
C.S0054-A, "cdma2000 HIgh Rate Broadcast-MultIcast Packet Data AIr Interface Specification", Mar. 2006.
Partial International Search Report—PCT/US07/070907, International Search Authority, European Patent Office—Jan. 22, 2008.
QUALCOMM Incorporated: "QFDD Technology Overview Presentation," IEEE 802.20 Working Group on Mobile Broadband Wireless Access, [Online] No. C802.20-05-59, pp. 45-47 (Oct. 28, 2005) XP002518168 [Retrieved from the Internet: URL:http://grouper.ieee.org/groups/.
802.20 Working Group of the IEEE 802 LAN/MAN Standards Committee: "IEEE P802.20/D1 Draft Standard for Mobile Broadband Wireless Access," IEEE 802 LAN/MAN Standards Committee [Online] pp. 469-472 (Jan. 2006) XP002518169 [Retrieved from the Internet: URL: http://pddocserv/specdocs/data/standards/telecom/IEEE802/IEEE802-20/20/private/P802.20-D3.0_with_bookmark.pdf (retrieved Mar. 4, 2009)].
International Search Report, PCT/US2007/070907—International Search Authority —European Patent Office, Mar. 27, 2009.
Written Opinion, PCT/US2007/070907—International Search Authority—European Patent Office, Mar. 27, 2009.
International Preliminary Report on Patenability, PCT/US2007/070907—The International Bureau of WIPO—Geneva, Switzerland, Apr. 7, 2009.
Taiwan Search Report—TW096121326—TIPO—Sep. 7, 2011.

* cited by examiner

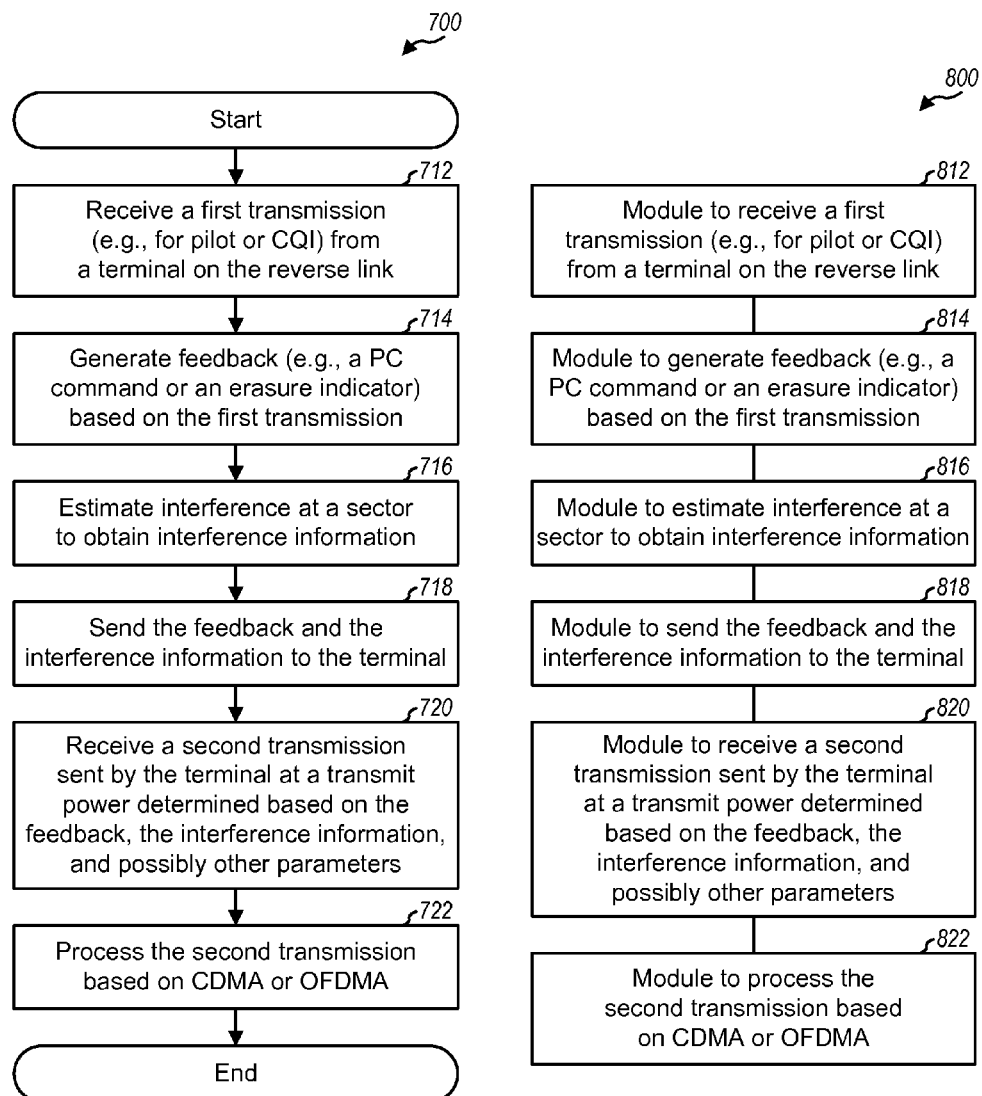

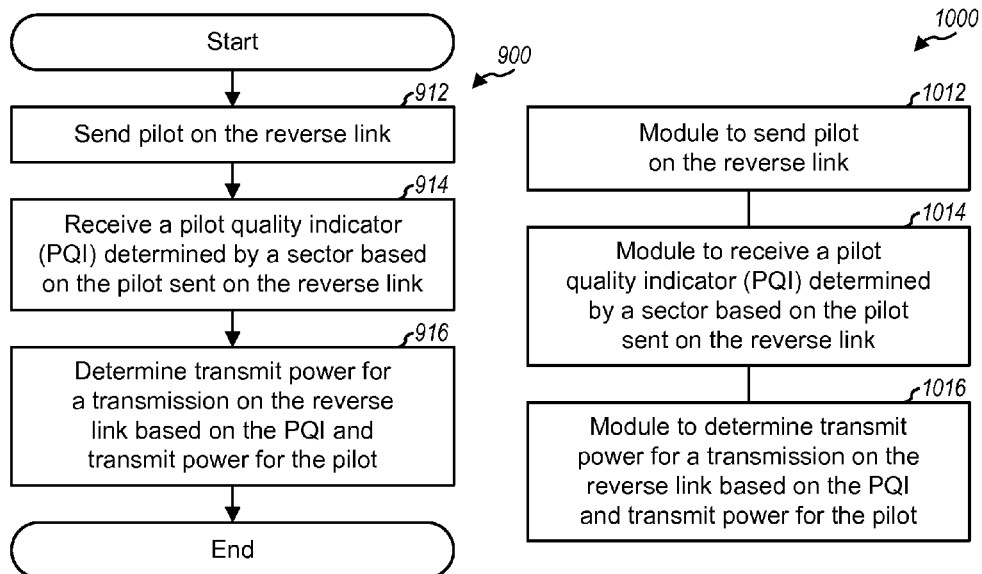
FIG. 9
FIG. 10
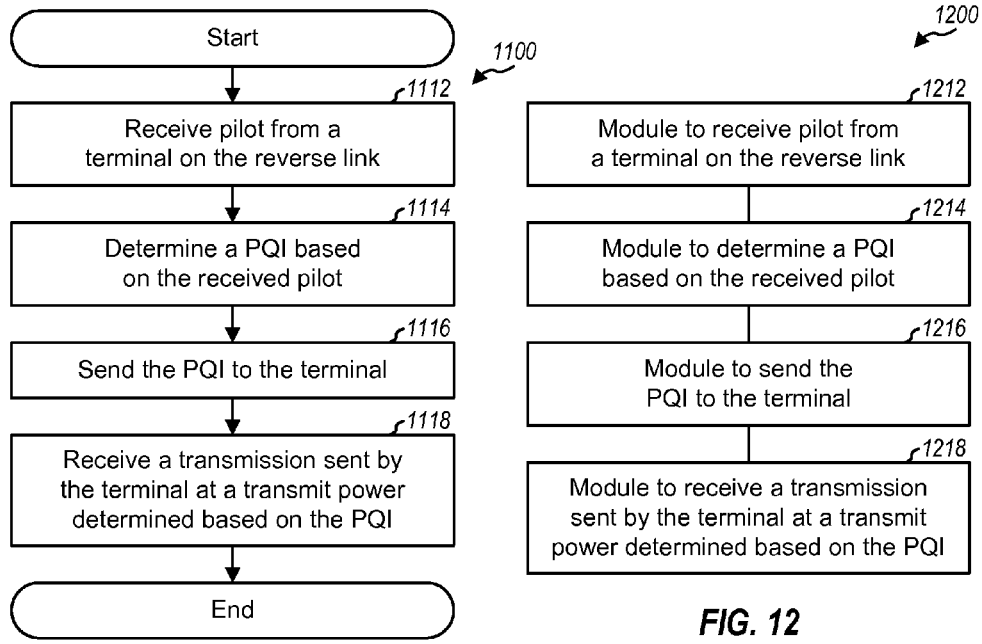
FIG. 11
FIG. 12

POWER CONTROL FOR WIRELESS COMMUNICATION SYSTEMS

The present application claims priority to provisional U.S. Application Ser. No. 60/813,484, entitled "POWER CONTROL FOR WIRELESS COMMUNICATION SYSTEMS," filed Jun. 13, 2006, assigned to the assignee hereof and incorporated herein by reference.

BACKGROUND

I. Field

The present disclosure relates generally to communication, and more specifically to techniques for performing power control in a wireless communication system.

II. Background

Wireless communication systems are widely deployed to provide various communication services such as voice, video, packet data, messaging, broadcast, etc. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless multiple-access communication system can communicate with multiple terminals on the forward and reverse links. The forward link (or downlink) refers to the communication link from the base stations to the terminals, and the reverse link (or uplink) refers to the communication link from the terminals to the base stations.

Multiple terminals may simultaneously receive data on the forward link and/or transmit data on the reverse link. This may be achieved by multiplexing the transmissions on each link to be orthogonal to one another in time, frequency and/or code domain. On the reverse link, complete orthogonality, if achieved, results in the transmission from each terminal not interfering with the transmissions from other terminals at a receiving base station. However, complete orthogonality among the transmissions from different terminals is often not realized due to channel conditions, receiver imperfections, etc. The loss of orthogonality results in each terminal causing some amount of interference to other terminals communicating with the same base station. Furthermore, the transmissions from terminals communicating with different base stations are typically not orthogonal to one another. Thus, each terminal may also cause interference to other terminals communicating with nearby base stations. The performance of each terminal is degraded by the interference from other terminals in the system.

There is therefore a need in the art for techniques to control the transmit power of the terminals to reduce interference and achieve good performance.

SUMMARY

Techniques for controlling transmit power of terminals are described herein. In one design, a terminal may send a first transmission (e.g., for pilot, channel quality indicator (CQI), etc.) on the reverse link and may receive feedback (e.g., a power control command, an erasure indicator, etc.) for the first transmission. The terminal may adjust a reference power level based on the feedback. The terminal may also receive interference information from a sector. The interference information may comprise a rise over thermal ratio (RoT) at the sector, an interference over thermal ratio (IoT) at the sector, etc. The terminal may also receive other parameters such as a pilot quality indicator (PQI), an offset factor, a boost factor, etc. The terminal may determine transmit power for a second transmission (e.g., for data or signaling) to the sector based on the interference information, the reference power level, and/or the other parameters. The terminal may receive the feedback from one sector and may send the second transmission to the same sector or a different sector.

In one design, the interference information comprises an RoT, and the transmit power for the second transmission is determined based on the RoT and the reference power level. The second transmission may be sent at the determined transmit power with CDMA. In another design, the interference information comprises an IoT, and the transmit power for the second transmission is determined based on the IoT and the reference power level. The second transmission may be sent at the determined transmit power with OFDMA.

Various aspects and features of the disclosure are described in further detail below.

BRIEF DESCRIPTION OF THE DRAWINGS

FIGS. 7 and 8 show a process and an apparatus, respectively, for a sector for power control of a terminal based on interference information.

FIGS. 9 and 10 show a process and an apparatus, respectively, for a terminal for power control based on pilot quality indicator (PQI).

FIGS. 11 and 12 show a process and an apparatus, respectively, for a sector for power control of a terminal based on PQI.

DETAILED DESCRIPTION

Figure 1:
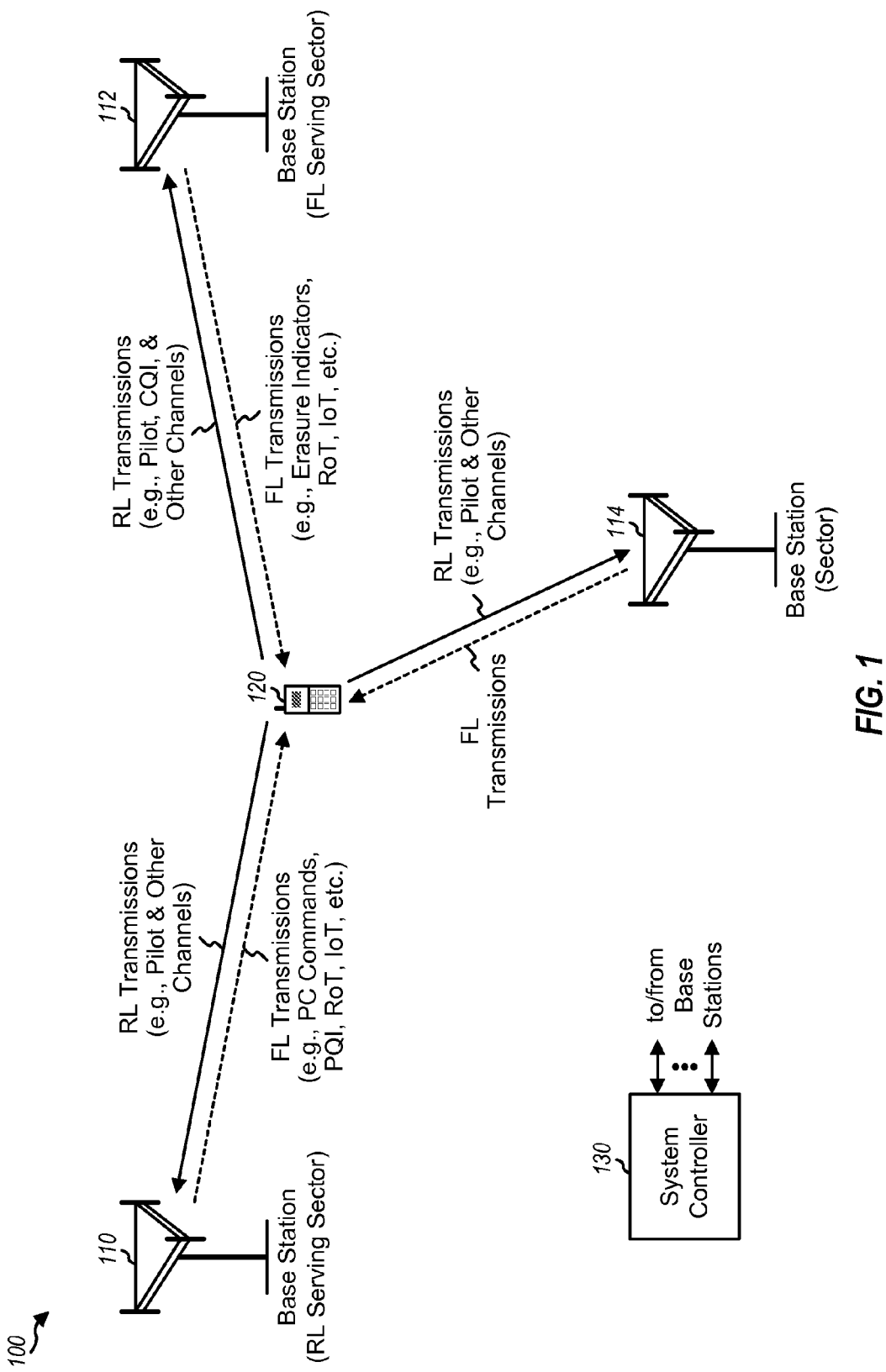
FIG. 1 shows a wireless communication system.

FIG. 1 shows a wireless communication system 100. For simplicity, only three base stations 110, 112 and 114 and one terminal 120 are shown in FIG. 1. A base station is a station that communicates with the terminals. A base station may also be called, and may contain some or all of the functionality of, an access point, a Node B, an evolved Node B, etc. Each base station provides communication coverage for a particular geographic area. The term "cell" can refer to a base station and/or its coverage area depending on the context in which the term is used. To improve system capacity, a base station coverage area may be partitioned into multiple (e.g., three) smaller areas. Each smaller area may be served by a respective base transceiver station (BTS). The term "sector" can refer to a BTS and/or its coverage area depending on the context in which the term is used. For a sectorized cell, the BTSs for all sectors of that cell are typically co-located within the base station for the cell.

For a centralized architecture, a system controller 130 may couple to the base stations and provide coordination and control for these base stations. System controller 130 may be a single network entity or a collection of network entities. For a distributed architecture, the base stations may communicate with one another as needed.

In general, many terminals may be dispersed throughout system 100, and each terminal may be stationary or mobile. Terminal 120 may also be called, and may contain some or all of the functionality of, an access terminal, a mobile station, a user equipment, a subscriber unit, a station, etc. Terminal 120 may be a cellular phone, a personal digital assistant (PDA), a wireless device, a wireless modem, a handheld device, a laptop computer, etc. Terminal 120 may communicate with zero, one, or multiple base stations on the forward and/or reverse link at any given moment. FIG. 1 shows terminal 120 sending RL transmissions to the base stations and receiving FL transmissions from these base stations. The various types of transmission in FIG. 1 are described below.

The power control techniques described herein may be used for systems with sectorized cells as well as systems with unsectorized cells. For clarity, the techniques are described below for a system with sectorized cells. The terms "base station" and "sector" are synonymous and are used interchangeably herein. In the example shown in FIG. 1, sector 110 is an RL serving sector for terminal 120, sector 112 is an FL serving sector for terminal 120, and sector 114 may or may not be in communication with terminal 120.

The techniques described herein may also be used for various wireless communication systems such as CDMA, TDMA, FDMA, OFDMA, and SC-FDMA systems. A CDMA system utilizes code division multiplexing (CDM), and transmissions are sent with different orthogonal codes, pseudo-random sequences, etc. A TDMA system utilizes time division multiplexing (TDM), and transmissions are sent in different time slots. An FDMA system utilizes frequency division multiplexing (FDM), and transmissions are sent on different subcarriers. An OFDMA system utilizes orthogonal frequency division multiplexing (OFDM), and an SC-FDMA system utilizes single-carrier frequency division multiplexing (SC-FDM). OFDM and SC-FDM partition the system bandwidth into multiple orthogonal subcarriers, which are also referred to as tones, bins, etc. Each subcarrier may be modulated with data. In general, modulation symbols are sent in the frequency domain with OFDM and in the time domain with SC-FDM. The techniques may also be used for wireless communication systems that utilize a combination of multiplexing schemes, e.g., CDMA and OFDMA, OFDMA and SC-FDMA, etc. For clarity, certain aspects of the techniques are described below for a system that utilizes CDMA and OFDMA on the reverse link.

Figure 2:
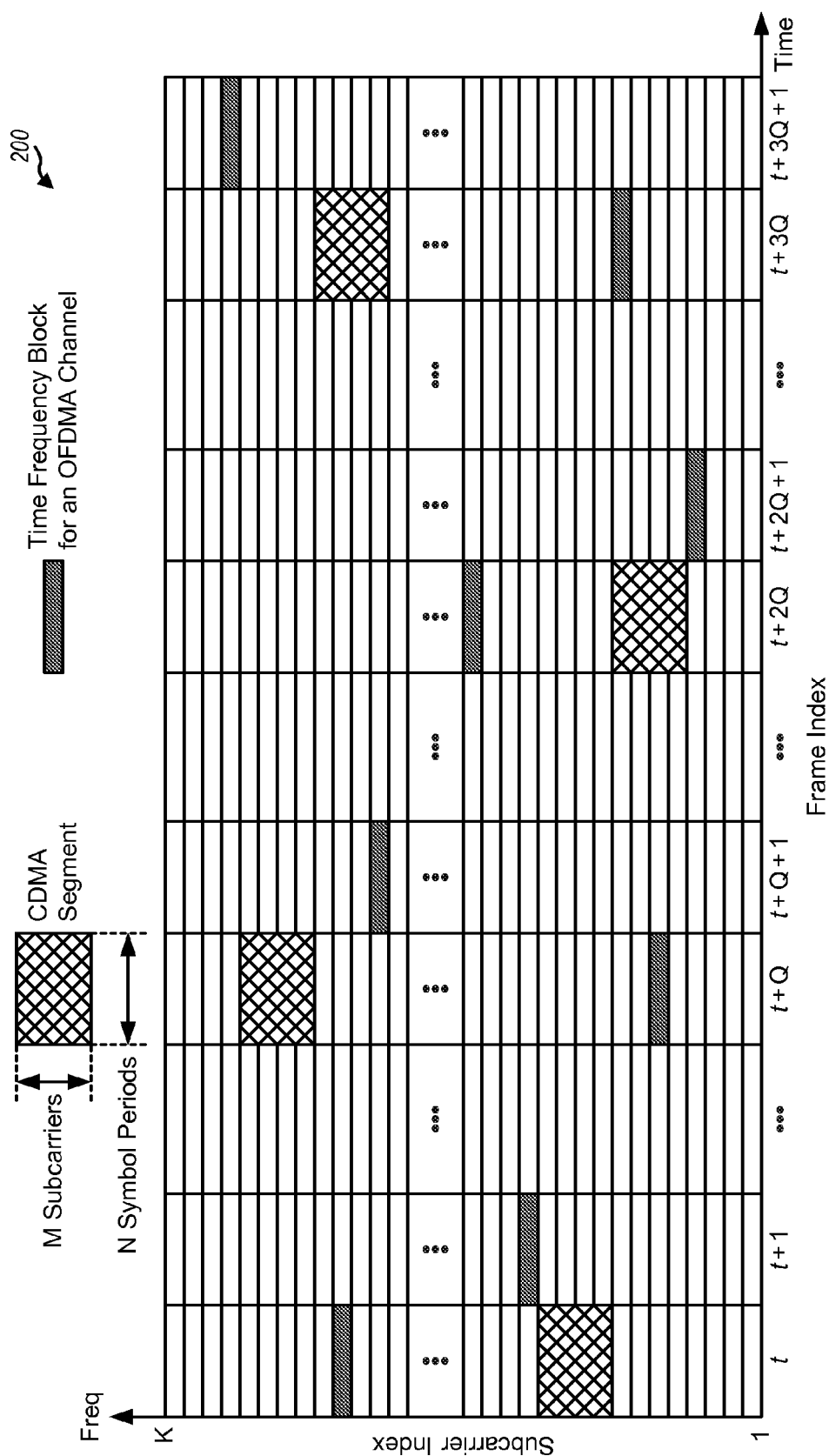
FIG. 2 shows a frame structure for the reverse link.

FIG. 2 shows a design of a frame structure 200 that may be used for the reverse link. The transmission timeline may be partitioned into frames, which may also be referred to as physical layer (PHY) frames, time slots, etc. The frames may be assigned sequential indices, as shown in FIG. 2. Each frame may span a particular time duration, which may be fixed or configurable. For example, each frame may span N symbol periods, where in general $N \geq 1$ and in one design $N=8$.

FIG. 2 also shows a subcarrier structure. The system bandwidth may be partitioned into multiple (K) orthogonal subcarriers that may be assigned indices of 1 through K. In a spectrally shaped system, only a subset of the K total subcarriers may be used for transmission, and the remaining subcarriers may serve as guard subcarriers to allow the system to meet spectral mask requirements.

FIG. 2 also shows a design of a CDMA segment that may support transmission of pilot and signaling on the reverse link. The CDMA segment may occupy a time frequency block of any fixed or configurable dimension. In the design shown in FIG. 2, the CDMA segment covers M contiguous subcarriers and spans N symbol periods of one frame. For a design with N=8 and M=128, the CDMA segment covers $L=M \cdot N=1024$ transmission units. Each transmission unit is one subcarrier in one symbol period and may be used to send one modulation symbol. In general, the CDMA segment may include S CDMA subsegments, where $S \geq 1$, and each CDMA subsegment may support pilot and signaling for a set of terminals. Each CDMA subsegment may cover M contiguous subcarriers in one frame of N symbol periods and may have a dimension of M×N. For simplicity, much of the following description assumes that the CDMA segment includes one CDMA subsegment. The CDMA segment may be sent at any rate. In the design shown in FIG. 2, the CDMA segment is sent in every Q frames, where in general $Q \geq 1$ and as some examples Q=4, 6, 8, etc. The CDMA segment may hop across the system bandwidth from CDMA frame to CDMA frame (as shown in FIG. 2) or may be sent on a fixed set of subcarriers (not shown in FIG. 2). A CDMA frame is a frame in which the CDMA segment is sent. The CDMA segment may support various control channels and may be shared by the terminals, as described below.

FIG. 2 also shows a design of an OFDMA channel that may carry traffic data, signaling, etc. The OFDMA channel may be mapped to a sequence of time frequency blocks, which may hop across frequency over time to achieve frequency diversity, as shown in FIG. 2. Each time frequency block for the OFDMA channel may be of any dimension, which may be dependent on the amount of information to send on the OFDMA channel.

Various channels may be defined to carry data, pilot, and signaling on the reverse link. Table 1 shows a set of channels in accordance with one design. The first column of Table 1 lists the different channels. The second column gives the multiplexing scheme used for each channel, e.g., CDMA or OFDMA. The third column gives the recipient sector for each channel, which may be the RL serving sector (RLSS), the FL serving sector (FLSS), or all sectors. The fourth column gives a short description for each channel.

TABLE 1

| Channel | Type | Sector | Description |
|---|---|---|---|
| DCH | OFDMA | RLSS | Data channel carrying packets on the reverse link. |
| PICH | CDMA | All | Pilot channel for the reverse link. |
| CQICH | CDMA | FLSS | CQI channel carrying information on forward link channel quality. |
| ACKCH | OFDMA | FLSS | Acknowledgement (ACK) channel carrying ACKs for data packets received on the forward link. |
| BFCH | CDMA | FLSS | Beamforming feedback channel carrying information used for beamforming on the forward link. |
| SFCH | CDMA | FLSS | Subband feedback channel carrying information used for subband scheduling on the forward link. |

TABLE 1-continued

| Channel | Type | Sector | Description |
|---|---|---|---|
| REQCH | CDMA | RLSS | Request channel carrying requests for time frequency resources on the reverse link. |
| ACH | CDMA | RLSS | Access channel carrying access probes for accessing the system. |

Table 1 shows one example design. The channels may also be sent to more sectors than those listed in Table 1. For example, the CQICH may be sent to all sectors instead of just the FL serving sector. The ACH and REQCH may also be sent to all sectors when carrying handoff indications. In general, the system may support any number of channels and any type of channel on the reverse link. For example, an OFDMA dedicated control channel (ODCCH) may carry MIMO CQI, BFCH, and SFCH information to the FL serving sector. Each channel may be sent with CDMA, OFDMA, etc. In the following description, a CDMA channel is a channel sent with CDMA, and an OFDMA channel is a channel sent with OFDMA. The CDMA channels may be sent on the CDMA segment. The OFDMA channels may be sent on time frequency resources not used for the CDMA segment or reserved for other purposes.

A CDMA channel may be processed and sent in various manners. In one design, a message (e.g., a CQI value) may be sent on the CDMA channel by encoding the message to obtain a coded message (e.g., a Walsh sequence). The coded message may then be multiplied with a channelization sequence for the CDMA channel and further scaled by a gain to obtain an output sequence. The gain may be determined based on the transmit power for the CDMA channel, which may be set to achieve a target level of performance, e.g., a target error rate, a target erasure rate, etc. The output sequence may be scrambled with a scrambling sequence, which may be generated based on an index of a CDMA frame in which the CDMA channel is sent, an identifier for a terminal sending the message, an identifier for a target sector to which the message is sent, etc. The scrambled sequence may be partitioned into N subsequences of M chips, one subsequence for each symbol period of the CDMA frame. Each subsequence may be transformed to the frequency domain with a fast Fourier transform (FFT) to obtain M symbols, which may be mapped to M subcarriers used for the CDMA segment.

Messages for different CDMA channels may be encoded, multiplied with different channelization codes, scaled based on the transmit power for these CDMA channels, combined, scrambled, transformed to the frequency domain, and mapped to the subcarriers for the CDMA segment. The message for each CDMA channel may be sent on all L transmission units in the CDMA segment. Different CDMA channels may be assigned different channelization codes, and these CDMA channels may share the CDMA segment via CDM.

An OFDMA channel may also be sent in various manners. In one design, a packet may be processed (e.g., encoded, interleaved, and symbol mapped) to obtain data symbols. The data symbols may then be mapped to time frequency blocks for the OFDMA channel.

The OFDMA channels for the reverse link for a given sector may be assigned different time frequency resources and may then be orthogonal to one another in frequency and time. The OFDMA channels may thus minimally interfere with one another at the sector, and there may be little intra-sector interference among terminals transmitting on these OFDMA channels. Consequently, terminals located closer to the sector may potentially be received at higher power spectral density (PSD) with little impact to other terminals in the same sector since there is no "near-far" effect.

However, the performance of the OFDMA channels may be impacted by inter-sector interference, which is interference from other sectors. The inter-sector interference may be quantified by an interference over thermal ratio (IoT), which may be given as:

$$IoT = \frac{\text{inter-sector interference} + \text{thermal noise}}{\text{thermal noise}}. \quad \text{Eq (1)}$$

The system bandwidth may be partitioned into one or multiple subbands or subzones, and one IoT value may be determined for each subband or subzone. A sector may estimate the IoT and send the IoT to the terminals, which may adjust the transmit power of the OFDMA channels accordingly to achieve the desired performance.

The CDMA channels for multiple terminals may share the same CDMA segment for a given sector. The CDMA transmission from each of these multiple terminals may then act as interference to the CDMA transmissions from other terminals sharing the same CDMA segment at the sector. The capacity and stability of the CDMA segment may be quantified by a rise over thermal ratio (RoT), which may be expressed as:

$$RoT = \frac{\text{total received power at sector}}{\text{thermal noise}}. \quad \text{Eq (2)}$$

If the CDMA segment includes multiple CDMA subsegments, then one RoT value may be determined for each CDMA subsegment.

In general, capacity increases for higher RoT. However, capacity gains diminish above a particular RoT value. A sector may estimate the RoT and send the RoT to the terminals, which may adjust the transmit power of the CDMA channels accordingly to achieve the desired performance.

Figure 3:
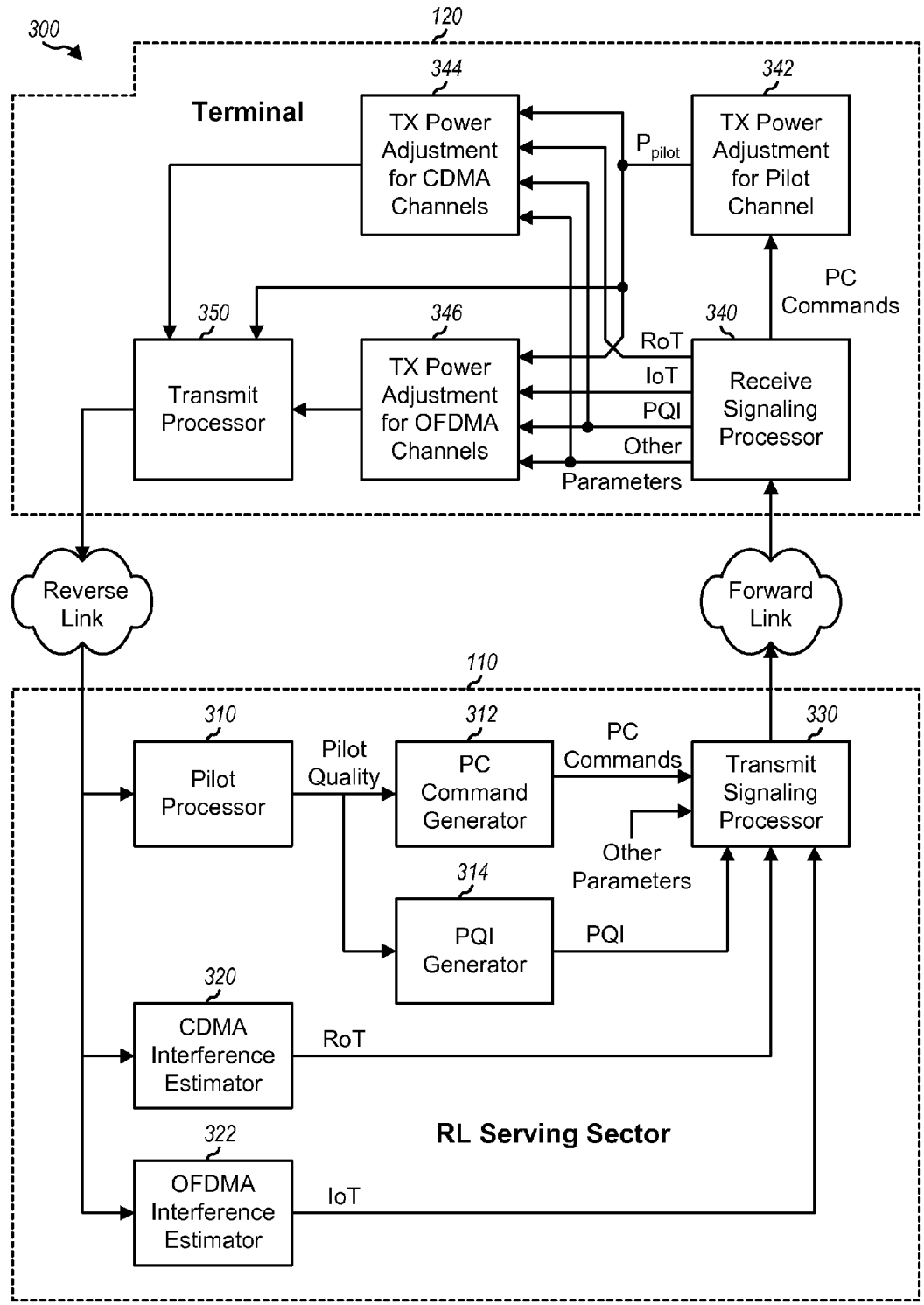
FIG. 3 shows a power control mechanism for CDMA and OFDMA channels.

FIG. 3 shows a design of a power control mechanism 300 for the CDMA and OFDMA channels sent on the reverse link, e.g., the channels shown in Table 1. Power control mechanism 300 operates between RL serving sector 110 and terminal 120 in FIG. 1. Terminal 120 may transmit the pilot channel and other CDMA channels on the CDMA segment to sector 110 and may also transmit OFDMA channels on time frequency resources assigned to terminal 120 by sector 110.

Sector 110 may receive the transmissions from terminal 120 and other terminals on the reverse link. At sector 110, a pilot processor 310 may process the received transmissions in a manner complementary to the processing performed by terminal 120 for the pilot channel in order to detect for the pilot from terminal 120. Processor 310 may combine received pilot power for terminal 120 across all antennas at sector 110 and for all channel taps used to detect for the pilot. Processor 310 may then determine pilot quality (PQ) for terminal 120 based on the received pilot power.

In one design, the pilot quality may be given by a pilot carrier-over-thermal ratio (PCoT), which may be expressed as:

$$PCoT = \frac{\text{average received pilot power per subcarrier}}{\text{average thermal noise per subcarrier}}. \quad \text{Eq (3)}$$

PCoT does not take into account inter-sector and intra-sector interference at sector 110.

In another design, the pilot quality may be given by a pilot carrier-to-interference ratio (C/I), which may be expressed as:

$$\text{Pilot } C/I = \frac{\text{average received pilot power per subcarrier}}{\text{average total noise and interference per subcarrier}}. \quad \text{Eq (4)}$$

The total noise and interference is the total received power at sector 110 and includes intra-sector interference, inter-sector interference, and thermal noise. The pilot quality may also be given by other parameters.

A power control (PC) command generator 312 may receive the measured pilot quality (PQ) from processor 310, compare the measured PQ against a PQ threshold, and provide a PC command, as follows:

$$PC \text{ Command} = \begin{cases} \text{Up Command} & \text{if measured } PQ < PQ \text{ threshold} \\ \text{Down Command} & \text{otherwise} \end{cases} \quad \text{Eq (5)}$$

In one design, the PC commands for terminal 120 may be generated based on a measured PCoT and a PCoT threshold. In this design, the transmit power of the pilot channel may be adjusted based on the PC commands such that the measured PCoT is approximately equal to the PCoT threshold at sector 110. The transmit power of other CDMA and OFDMA channels may be set based on the pilot transmit power, as described below. The measured PCoT does not take into account inter-sector and intra-sector interference. Since inter-sector and intra-sector interference may be negligible for an OFDMA channel, the transmit power of the OFDMA channel may be more accurately set based on the pilot transmit power to achieve the desired received signal quality for the OFDMA channel. This design may thus provide improved performance for OFDMA channels.

In another design, the PC commands for terminal 120 may be generated based on a measured pilot C/I and a pilot C/I threshold. In this design, the transmit power of the pilot channel may be adjusted based on the PC commands such that the measured pilot C/I is approximately equal to the pilot C/I threshold. The transmit power of other CDMA and OFDMA channels may be set based on the pilot transmit power. The measured pilot C/I takes into account inter-sector and intra-sector interference, and the intra-sector interference may be relatively high for the CDMA segment. Hence, the measured pilot C/I may have less fluctuation than the measured PCoT, and the pilot transmit power may have less fluctuation when adjusted based on the pilot C/I.

A pilot quality indicator (PQI) generator 314 may receive the pilot quality from processor 310 and generate a PQI for terminal 120. In one design, generator 314 may quantize the measured PCoT to a predetermined number of bits and provide the quantized PCoT as the PQI for terminal 120. In other designs, generator 314 may generate the PQI based on the pilot C/I or some other measure of pilot quality.

A CDMA interference estimator 320 may estimate the RoT of the CDMA segment at sector 110. Estimator 320 may measure the total received power of the CDMA segment in the time domain by summing the power of all received samples for the CDMA segment. Estimator 320 may also measure the total received power of the CDMA segment in the frequency domain by summing the power of received symbols from all subcarriers used for the CDMA segment. Estimator 320 may estimate thermal noise, e.g., during a silence interval in which no transmissions are sent, or on guard subcarriers not used for transmission. Estimator 320 may then derive the RoT of the CDMA segment as shown in equation (2).

An OFDMA interference estimator 322 may estimate the IoT at sector 110. Estimator 322 may measure the inter-sector interference at sector 110, e.g., on subcarriers not used for transmission to sector 110. Estimator 322 may estimate the thermal noise or obtain this information from estimator 320. Estimator 322 may then derive the IoT at sector 110 as shown in equation (1). Estimator 322 may also compare the IoT against one or more IoT thresholds and may generate an other-sector interference (OSI) value based on the comparison result. For example, the OSI value may be set to '0' if the IoT is below a target IoT, set to '1' if the IoT is greater than the target IoT but below a high IoT, and set to '2' if the IoT is greater than the high IoT.

A transmit signaling processor 330 may receive the PC commands from generator 312, the PQI from generator 314, the RoT from estimator 320, the IoT and OSI from estimator 322, and possibly other parameters such as an offset factor, a boost factor, etc. These various parameters may be used by terminal 120 to set the transmit power of the CDMA and OFDMA channels. Processor 330 may process and send the PC commands, PQI, and other parameters to terminal 120, e.g., on one or more FL signaling channels. In general, the PC commands, PQI, and other parameters may be sent at the same rate or different rates. In one design, the PC commands may be sent at a rate of approximately 140 Hertz, the PQI may be sent at a rate of approximately 70 Hertz, and the other parameters may be sent whenever they are updated. Processor 330 may also process and send the RoT and IoT to terminal 120 and other terminals in the sector, e.g., via a broadcast channel, an FL control channel, etc. For example, the RoT and/or IoT may be broadcast in a preamble of every superframe covering 25 frames, on an FL control channel sent every Q frames, where $Q \geq 1$, via signaling messages, etc.

Terminal 120 may receive the various parameters from sector 110 and may set the transmit power of the CDMA and OFDMA channels based on these parameters. At terminal 120, a receive signaling processor 340 may receive and process the FL transmissions from sector 110 to obtain the PC commands, PQI, and other parameters for terminal 120 and the RoT and IoT for sector 110. A unit 342 may receive the PC commands and adjust the transmit power of the pilot channel, as follows:

$$P_{pilot}(n) = \quad \text{Eq (6)}$$
$$\begin{cases} P_{pilot}(n-1) + \Delta P_{pilot} & \text{if an Up command is received} \\ P_{pilot}(n-1) - \Delta P_{pilot} & \text{if a Down command is received} \end{cases}$$

where $P_{pilot}(n)$ is the transmit power of the pilot channel in update interval n, and $\Delta P_{pilot}$ is a step size for adjusting the pilot transmit power. Update interval n may or may not coincide with a transmission interval for a given channel. Whenever a channel is transmitted, the $P_{pilot}(n)$ value from the most recent update interval may be used to determine the transmit power for that channel.

The pilot transmit power $P_{pilot}(n)$ and the step size $\Delta P_{pilot}$ may be given in units of decibels (dB). In the design shown in equation (6), the pilot transmit power may be increased or decreased by the same step size, e.g., 0.5 dB, 1.0 dB, etc., which may be selected to provide good performance. In another design, the pilot transmit power may be adjusted by different up and down step sizes. A transmit processor 350 may generate and transmit the pilot on the CDMA segment at a transmit power level of $P_{pilot}(n)$.

A unit 344 may receive the pilot transmit power from unit 342 and the PQI, RoT, and/or other parameters from processor 340. Unit 344 may set the transmit power of the CDMA channels in various manners.

In one design, unit 344 may set the transmit power of a given CDMA channel, as follows:

$$PSD_{CDMA}(n)=PSD_{pilot}(n)+\text{offset}+\text{boost}, \quad \text{Eq (7)}$$

where $PSD_{pilot}(n)$ is the PSD of the pilot channel in update interval n, $PSD_{CDMA}(n)$ is the PSD of the CDMA channel in update interval n, offset is a value applied to all transmissions sent on the CDMA channel, and boost is a value applied to certain transmissions sent on the CDMA channel.

The pilot PSD may be obtained by dividing the pilot transmit power by the number of transmission units used to send the pilot, or $PSD_{pilot}(n)=P_{pilot}(n)/L$. Conversely, the transmit power of the CDMA channel may be obtained by multiplying its PSD with the number of transmission units used to send the CDMA channel, or $P_{CDMA}(n)=L \cdot PSD_{CDMA}(n)$ if the CDMA channel is also sent in L transmission units.

The offset and boost factors may be sent by sector 110 to terminal 120. The offset factor may be set based on a target SNR for the pilot channel, a target SNR for the CDMA channel, etc. The offset factor may be a negative value, a positive value, or zero. The boost factor may be set based on the importance of a message being sent and may be equal to zero or greater. For example, handoff indication, load control information (e.g., a null CQI), and other important information may be sent with a positive boost value to improve the likelihood of correctly receiving the information. Different boost values may also be used for request messages sent on the REQCH for different quality of service (QoS) classes, e.g., more boost for a request message sent for high QoS data, and vice versa.

In another design, unit 344 may set the transmit power of the CDMA channel, as follows:

$$PSD_{CDMA}(n)=PSD_{pilot}(n)+RoT+\text{offset}+\text{boost}. \quad \text{Eq (8)}$$

In yet another design, unit 344 may set the transmit power of the CDMA channel, as follows:

$$PSD_{CDMA}(n)=PSD_{pilot}(n)-PCoT+RoT+\text{target}C/I+ \\ \text{offset}+\text{boost}, \quad \text{Eq (9)}$$

where the target C/I is for the CDMA channel. In equation (9), the quantity $PSD_{pilot}(n)-PCoT$ is approximately equal to the path loss from terminal 120 to sector 110. The transmit power of the CDMA channel is thus set based on the path loss to achieve the target C/I for the CDMA channel.

In yet another design, unit 344 may set the transmit power of the CDMA channel, as follows:

$$PSD_{CDMA}(n)=PSD_{pilot}(n)-PCoT+\text{target }CoT+\text{offset}+ \\ \text{boost}, \quad \text{Eq (10)}$$

where the target CoT is for the CDMA channel. Sector 110 may be assumed to operate at a fixed RoT. Hence, RoT may be omitted from equation (10).

Unit 344 may set the transmit power of the CDMA channel in other manners. In general, unit 344 may set the transmit power of a given CDMA channel based on a reference power level (e.g., for the pilot) and zero or more parameters that may relate to the desired performance for the CDMA channel, interference at the target sector (e.g., RoT), etc.

Different CDMA channels may be associated with different offset, boost, and/or target C/I values. Sector 110 may set the offset, boost, and/or target C/I value for each CDMA channel to achieve the desired performance for that CDMA channel and may send updated values to terminal 120. Terminal 120 may set the transmit power of each CDMA channel based on the offset, boost, and/or target C/I values for that CDMA channel and using any of the designs described above.

Terminal 120 may send CDMA channels to more than one sector, e.g., RL serving sector 110, FL serving sector 112, and/or other sectors, as shown in FIG. 1. Different sectors may be associated with different RoT, PCoT, and/or target C/I values, which may be semi-static parameters that may change slowly, if at all, during a call. Terminal 120 may obtain the RoT, PCoT, and/or target C/I values for each sector (e.g., via Layer 3 signaling messages) and may set the transmit power of the CDMA channels sent to that sector based on the RoT, PCoT, and/or target C/I values for the sector.

A unit 346 may receive the pilot transmit power from unit 342 and the PQI, IoT, and/or other parameters from processor 340. Unit 346 may set the transmit power of the OFDMA channels in various manners.

In one design, unit 346 may set the transmit power of a given OFDMA channel, as follows:

$$PSD_{OFDMA}(n)=PSD_{pilot}(n)+\text{offset}+\text{boost}, \quad \text{Eq (11)}$$

where $PSD_{OFDMA}(n)$ is the PSD of the OFDMA channel in update interval n.

In another design, unit 346 may set the transmit power of the OFDMA channel, as follows:

$$PSD_{OFDMA}(n)=PSD_{pilot}(n)+IoT+\text{offset}+\text{boost}. \quad \text{Eq (12)}$$

In yet another design, unit 346 may set the transmit power of the OFDMA channel, as follows:

$$PSD_{OFDMA}(n)=PSD_{pilot}(n)-PCoT+IoT+\text{target }C/I+ \\ \text{offset}+\text{boost}. \quad \text{Eq (13)}$$

In yet another design, unit 346 may set the transmit power of the OFDMA channel, as follows:

$$PSD_{OFDMA}(n)=PSD_{pilot}(n)-PCoT+\text{target }CoT+\text{offset}+ \\ \text{boost}. \quad \text{Eq (14)}$$

Unit 346 may set the transmit power of the OFDMA channel in other manners. Unit 346 may also limit the transmit power of the OFDMA channel based on the OSI values received from nearby sectors. In general, unit 346 may set the transmit power of a given OFDMA channel based on a reference power level (e.g., for the pilot) and zero or more parameters that may relate to the desired performance for the OFDMA channel, interference at the target sector (e.g., IoT), etc.

For an OFDMA channel carrying traffic data, the minimum or maximum PSD for this OFDMA channel may be set based on any of the designs described above.

Different OFDMA channels may be associated with different offset, boost, and/or target C/I values. Sector 110 may set the offset, boost, and/or target C/I value for each OFDMA channel to achieve the desired performance for that OFDMA channel and may send updated values to terminal 120. Terminal 120 may set the transmit power of each OFDMA channel based on the offset, boost, and/or target C/I values for that OFDMA channel and using any of the designs described above.

Terminal 120 may send OFDMA channels to more than one sector. Different sectors may be associated with different IoT, PCoT, and/or target C/I values. Terminal 120 may obtain the IoT, PCoT, and/or target C/I values for each sector and may set the transmit power of the OFDMA channels sent to that sector based on the IoT, PCoT, and/or target C/I values for the sector.

Terminal 120 may have a single serving sector for both the forward and reverse links. In this case, terminal 120 may send all of the CDMA and OFDMA channels to one sector and may set the transmit power of these channels based on parameters received from this sector, e.g., as described above.

Terminal 120 may have different serving sectors for the forward and reverse links, which is referred to as disjoint link, e.g., as shown in FIG. 1. In this case, terminal 120 may send some CDMA and OFDMA channels to the RL serving sector and may set the transmit power of these channels based on parameters received from this sector. Terminal 120 may send other CDMA and OFDMA channels to the FL serving sector and may set the transmit power of these channels based on parameters received from this sector.

In one design, closed-loop power control may be performed for a first channel (e.g., the pilot channel) via the RL serving sector, and closed-loop power control may be performed for a second channel (e.g., the CQI channel) via the FL serving sector. The transmit power of the first channel may be used to set the transmit power of other channels sent to the RL serving sector. The transmit power of the second channel may be used to set the transmit power of other channels sent to the FL serving sector. This design may ensure good performance for different transmissions sent to different sectors.

Figure 4:
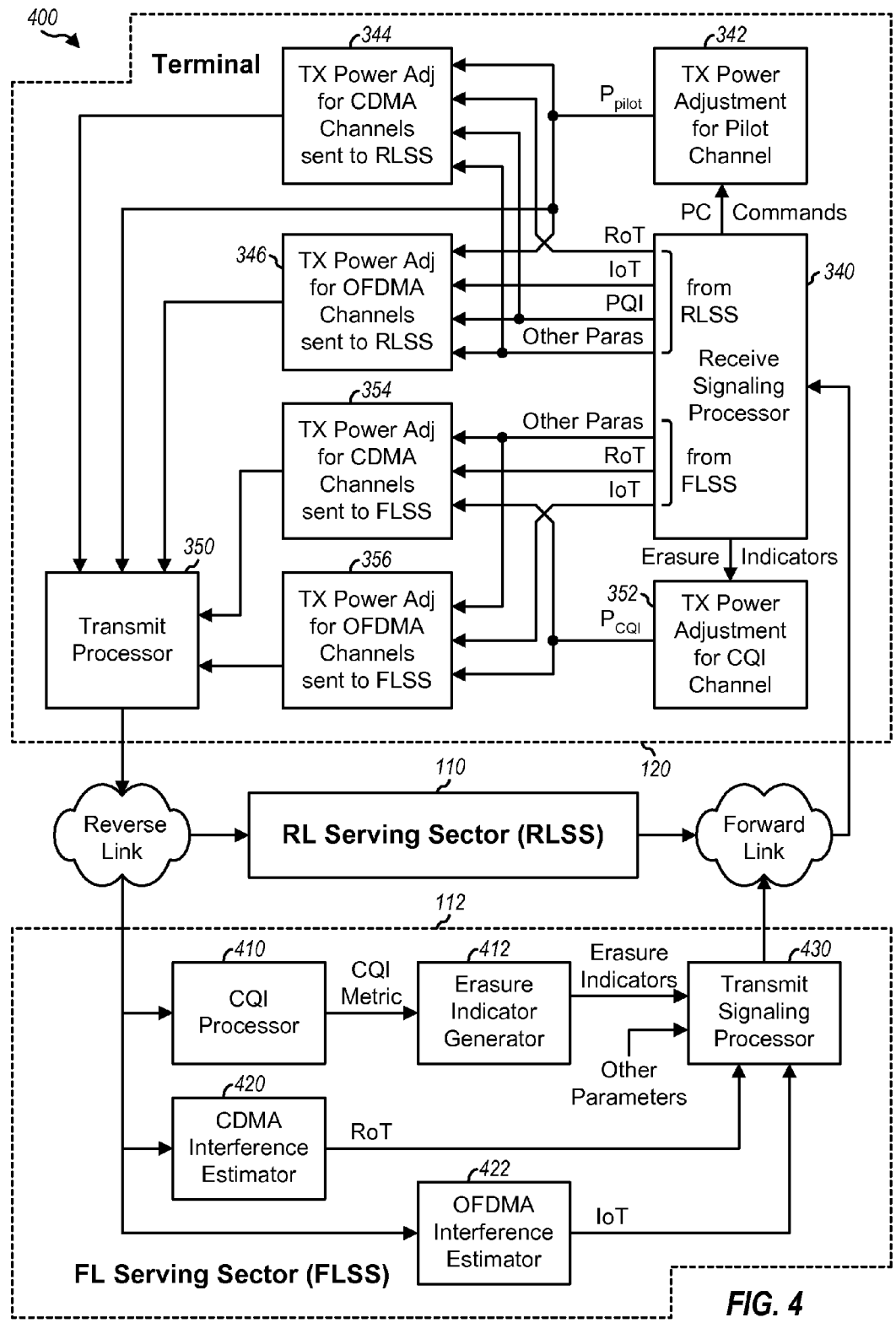
FIG. 4 shows a power control mechanism for separate closed-loop power control by a forward link (FL) serving sector and a reverse link (RL) serving sector.

FIG. 4 shows a design of a power control mechanism 400 for separate closed-loop power control by the FL and RL serving sectors. In this design, FL serving sector 112 performs closed-loop power control on the CQI channel. Terminal 120 may transmit the pilot channel and other CDMA and OFDMA channels on the reverse link. RL serving sector 110 may process its received transmissions and may send PC commands, PQI, RoT, IoT, and other parameters to terminal 120, e.g., as described above for FIG. 3.

FL serving sector 112 may also receive the transmissions from terminal 120 and other terminals on the reverse link. At sector 112, a CQI processor 410 may process the received transmissions in a manner complementary to the processing performed by terminal 120 for the CQI channel in order to detect for CQI values sent by terminal 120. Processor 410 may compute a metric for each codeword (or each CQI value) received on the CQI channel. Various types of metric may be used for erasure detection. In one design, energy is non-coherently combined across antennas at FL serving sector 112, and the metric is the largest combined energy among channel taps and data hypotheses. In this design, a larger metric corresponds to greater confidence in the received codeword being correct, and vice versa.

An erasure indicator generator 412 may receive the metric from processor 410, compare the metric against an erasure threshold, and provide an erasure indicator, as follows:

$$\text{Erasure Indicator} = \begin{cases} \text{Non-erased} & \text{if metric} > \text{erasure threshold} \\ \text{Erased} & \text{otherwise} \end{cases} \quad \text{Eq (15)}$$

The erasure threshold may be selected to achieve the desired performance.

A CDMA interference estimator 420 may estimate the RoT of the CDMA segment for sector 112. An OFDMA interference estimator 422 may estimate the IoT at sector 112. A transmit signaling processor 430 may receive the erasure indicators from generator 412, the RoT from estimator 420, the IoT from estimator 422, and possibly other parameters for terminal 120. Processor 430 may process and send the erasure indicators and other parameters to terminal 120. Processor 430 may also process and send the RoT and IoT to terminal 120 and other terminals in sector 112.

Terminal 120 may receive the FL transmissions from both RL serving sector 110 and FL serving sector 112. Receive signaling processor 340 may process the received transmissions to recover the parameters sent by sectors 110 and 112. Processor 340 may provide the parameters from RL serving sector 110 to units 342, 344 and 346 and may provide the parameters from FL serving sector 112 to units 352, 354 and 356. Units 342, 344 and 346 may set the transmit power of the pilot channel and the CDMA and OFDMA channels sent to RL serving sector 110 based on the parameters received from sector 110, as described above for FIG. 3.

For the CDMA and OFDMA channels sent to FL serving sector 112, unit 352 may receive the erasure indicators and adjust the transmit power of the CQI channel, as follows:

$$P_{CQI}(n) = \begin{cases} P_{CQI}(n-1) + \Delta P_{CQI} & \text{if an erased indicator is received} \\ P_{CQI}(n-1) - \Delta P_{CQI} & \text{if a non-erased indicator is received} \end{cases} \quad \text{Eq (16)}$$

where $P_{CQI}(n)$ is the transmit power of the CQI channel in update interval n, and $\Delta P_{CQI}$ is a step size for adjusting the CQI transmit power.

The CQI transmit power may be adjusted by equal up and down step sizes, as shown in equation (16), or by different up and down step sizes. Processor 350 may generate and transmit CQI values on the CQI channel at a transmit power level of $P_{CQI}(n)$. The CQI transmit power may be used as a reference power level for the CDMA and OFDMA channels sent to FL serving sector 112. Unit 354 may receive the CQI transmit power from unit 352 and the RoT and/or other parameters from processor 340. Unit 354 may set the transmit power of the CDMA channels sent to sector 112 based on any of the designs described above. Unit 356 may receive the CQI transmit power from unit 352 and the IoT and/or other parameters from processor 340. Unit 356 may set the transmit power of the OFDMA channels (e.g., the ACK channel) sent to sector 112 based on any of the designs described above.

In the design shown in FIG. 4, closed-loop power control is performed on the CQI channel by FL serving sector 112. In general, closed-loop power control may be performed on any channel sent to FL serving sector 112. The feedback from FL serving sector 112 may be dependent on the channel being power controlled. Sector 112 may send erasure indicators as shown in FIG. 4, PC commands, or other feedback that may be used by terminal 120 to adjust the transmit power of the channel being power controlled.

In general, the transmit power of the CDMA and OFDMA channels sent to FL serving sector 112 may be set based on (1) the transmit power of a channel that is power controlled by FL serving sector 112 or (2) the transmit power of a channel that is power controlled by RL serving sector 110. For example, the transmit power of the ACK channel sent to FL serving sector 112 may be set based on the transmit power of the CQI channel, which may be controlled by sector 112, or the transmit power of the pilot channel, which may be controlled by sector 110.

Figure 5:
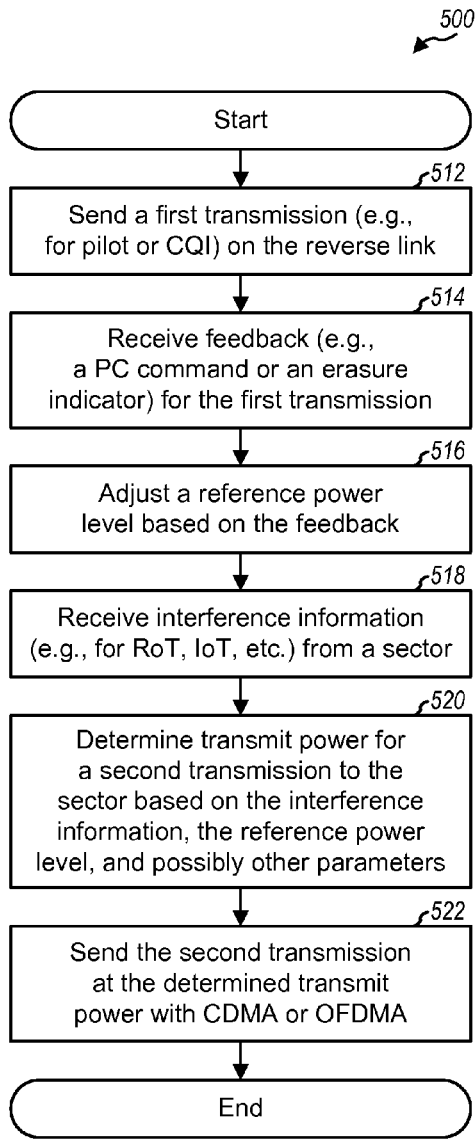
FIGS. 5 and 6 show a process and an apparatus, respectively, for a terminal for power control based on interference information.

FIG. 5 shows a design of a process 500 performed by a terminal for power control based on interference information. A first transmission may be sent on the reverse link (block 512). Feedback for the first transmission may be received (block 514). A reference power level may be adjusted based on the feedback (block 516). Interference information (e.g., for RoT, IoT, etc.) may be received from a sector (block 518). Transmit power for a second transmission to the sector may be determined based on the interference information, the reference power level, and possibly other parameters (block 520). For example, the transmit power for the second transmission may be determined further based on an offset factor for a channel used to send the second transmission. The offset factor may be set to achieve a target performance for the channel. Alternatively or additionally, the transmit power for the second transmission may be determined further based on a boost factor for the second transmission. The boost factor may be dependent on the type of information being sent in the second transmission, e.g., higher boost if the second transmission carries handoff information. The second transmission may be sent at the determined transmit power with CDMA or OFDMA (block 522).

In one design, the first transmission is for pilot, and the feedback comprises a PC command for the pilot. The transmit power for the pilot may be adjusted based on the PC command and used as the reference power level. In another design, the first transmission is for CQI, and the feedback comprises an erasure indicator for the CQI. The transmit power for the CQI may be adjusted based on the erasure indicator and used as the reference power level. The first transmission may also be for other types of transmission (e.g., other signaling), and other types of feedback may also be received and used to adjust the reference power level. The feedback may be received from one sector (e.g., an RL or FL serving sector), and the second transmission may be sent to the same sector. Alternatively, the feedback may be received from one sector (e.g., the RL serving sector), and the second transmission may be sent to another sector (e.g., the FL serving sector).

In one design, the interference information comprises an RoT, and the transmit power for the second transmission is determined based on the RoT and the reference power level. The second transmission may be sent at the determined transmit power with CDMA. In another design, the interference information comprises an IoT, and the transmit power for the second transmission is determined based on the IoT and the reference power level. The second transmission may be sent at the determined transmit power with OFDMA. The second transmission may be for data, signaling, etc.

Figure 6:
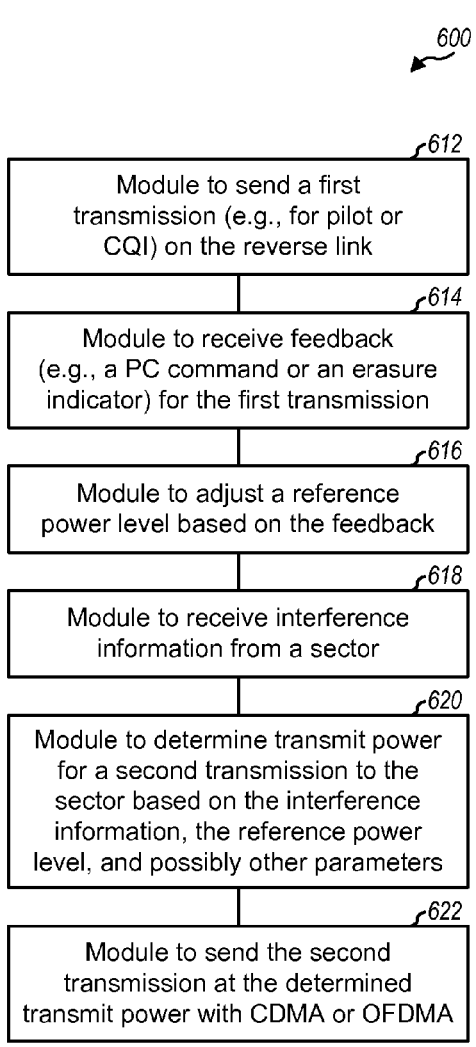

FIG. 6 shows a design of an apparatus 600 for a terminal. Apparatus 600 includes means for sending a first transmission on the reverse link (module 612), means for receiving feedback for the first transmission (module 614), means for adjusting a reference power level based on the feedback (module 616), means for receiving interference information from a sector (module 618), means for determining transmit power for a second transmission to the sector based on the interference information, the reference power level, and possibly other parameters (module 620), and means for sending the second transmission at the determined transmit power with CDMA or OFDMA (module 622).

FIG. 7 shows a design of a process 700 performed by a sector, e.g., an RL serving sector or an FL serving sector, for a terminal. A first transmission may be received from the terminal on the reverse link (block 712). Feedback may be generated based on the first transmission (block 714). Interference at the sector may be estimated to obtain interference information (block 716). The feedback and the interference information may be sent to the terminal (block 718). Thereafter, the sector may receive a second transmission sent by the terminal at a transmit power determined based on the feedback, the interference information, and possibly other parameters (block 720). The other parameters may comprise an offset factor for a channel used to send the second transmission, a boost factor for the second transmission, etc. The second transmission may be processed based on CDMA or OFDMA (block 722).

In one design, the first transmission is for pilot, a PCoT is determined based on the received pilot, and a PC command is generated based on the PCoT and sent as the feedback to the terminal. In another design, the first transmission is for pilot, a pilot C/I is determined based on the received pilot, and a PC command is generated based on the pilot C/I and sent as the feedback to the terminal. In yet another design, the first transmission is for CQI, and an erasure indicator is generated based on the received CQI and sent as the feedback to the terminal.

In one design, an RoT at the sector may be estimated and sent to the terminal. CDMA demodulation may be performed for the second transmission. In another design, an IoT at the sector may be estimated and sent to the terminal. OFDMA demodulation may be performed for the second transmission.

FIG. 8 shows a design of an apparatus 800 for a sector. Apparatus 800 includes means for receiving a first transmission from a terminal on the reverse link (module 812), means for generating feedback based on the first transmission (module 814), means for estimating interference at the sector to obtain interference information (module 816), means for sending the feedback and the interference information to the terminal (module 818), means for receiving a second transmission sent by the terminal at a transmit power determined based on the feedback, the interference information, and possibly other parameters (module 820), and means for processing the second transmission based on CDMA or OFDMA (module 822).

FIG. 9 shows a design of a process 900 performed by a terminal. Pilot may be sent on the reverse link (block 912). A PC command may be received, and the transmit power for the pilot may be adjusted based on the PC command. The terminal may receive a PQI determined by a sector based on the pilot sent on the reverse link (block 914). The PQI may comprise a PCoT, a pilot C/I, etc. Transmit power for a transmission on the reverse link may be determined based on the PQI and the transmit power for the pilot (block 916). Interference information may also be received from the sector and used to determine the transmit power for the transmission.

In one design, an RoT may be received from the sector, the transmit power for the transmission may be determined further based on the RoT, and the transmission may be sent at the determined transmit power with CDMA. In another design, an IoT may be received from the sector, the transmit power for the transmission may be determined further based on the IoT, and the transmission may be sent at the determined transmit power with OFDMA.

FIG. 10 shows a design of an apparatus 1000 for a terminal. Apparatus 1000 includes means for sending pilot on the reverse link (module 1012), means for receiving a PQI determined by a sector based on the pilot sent on the reverse link (module 1014), and means for determining transmit power for a transmission on the reverse link based on the PQI and transmit power for the pilot (module 1016).

FIG. 11 shows a design of a process 1100 performed by a sector, e.g., an RL serving sector or an FL serving sector, for a terminal. Pilot may be received from the terminal on the reverse link (block 1112). A PQI may be determined based on the received pilot (block 1114) and sent to the terminal (block 1116). Interference information (e.g., for RoT, IoT, etc.) may also be determined and sent to the terminal. The sector may then receive a transmission sent by the terminal at a transmit power determined based on the PQI and possibly other information (block 1118). The sector may process the transmission based on CDMA or OFDMA.

FIG. 12 shows a design of an apparatus 1200 for a sector. Apparatus 1200 includes means for receiving pilot from a terminal on the reverse link (module 1212), means for determining a PQI based on the received pilot (module 1214), means for sending the PQI to the terminal (module 1216), and means for receiving a transmission sent by the terminal at a transmit power determined based on the PQI and possibly other information (module 1218).

The modules in FIGS. 6, 8, 10 and 12 may comprise processors, electronics devices, hardware devices, electronics components, logical circuits, memories, etc., or any combination thereof.

Figure 13:
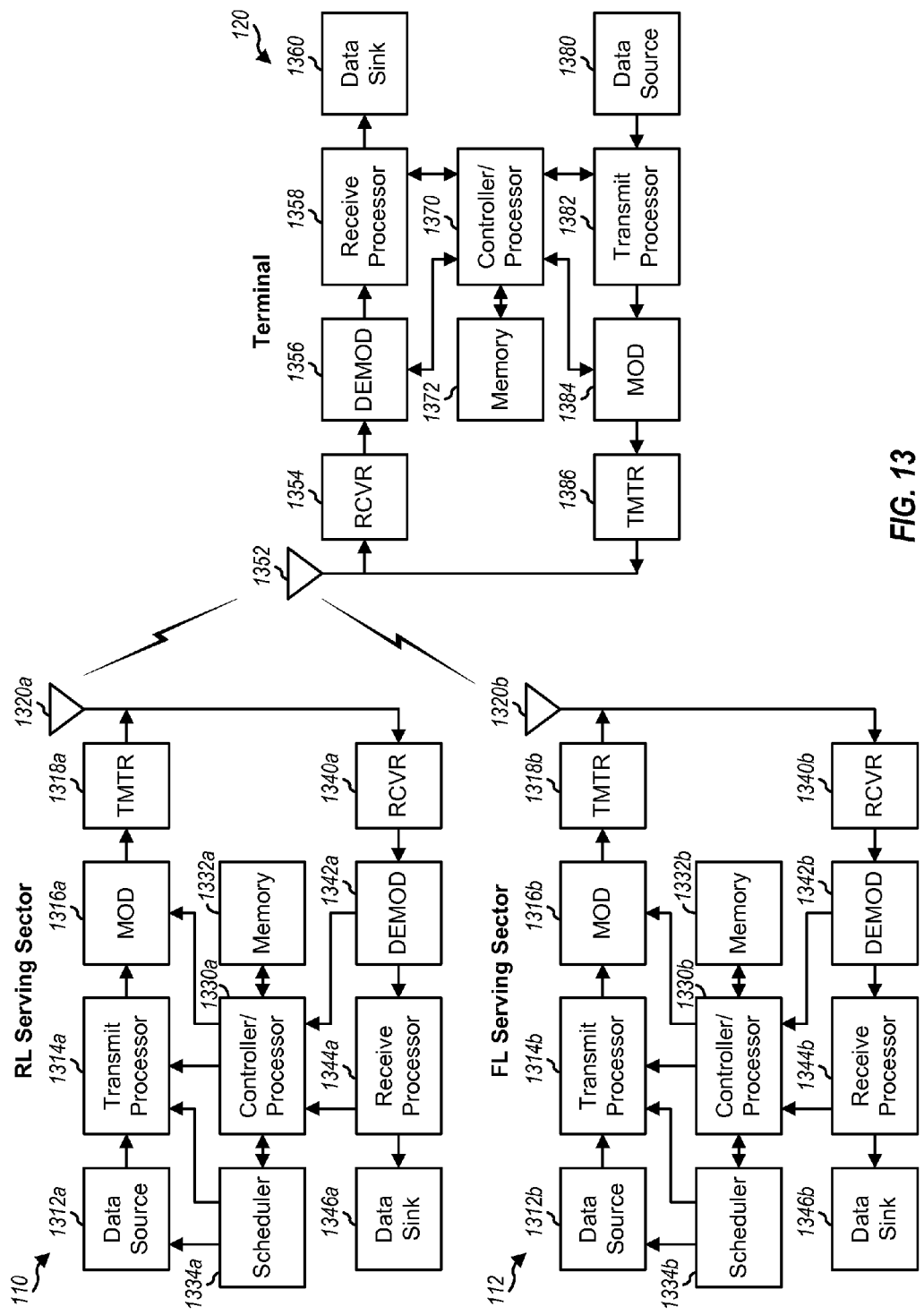
FIG. 13 shows a block diagram of a terminal and two base stations/sectors.

FIG. 13 shows a block diagram of a design of terminal 120, RL serving sector/base station 110, and FL serving sector/base station 112 in FIG. 1. At sector 110, a transmit processor 1314a may receive traffic data from a data source 1312a and signaling from a controller/processor 1330a and a scheduler 1334a. For example, controller/processor 1330a may provide the PC commands, PQIs, and other parameters for terminal 120 and the RoT and IoT for sector 110. Scheduler 1334a may provide an assignment of time frequency resources for terminal 120. Transmit processor 1314a may process (e.g., encode, interleave, and symbol map) the data, signaling, and pilot and provide data symbols, signaling symbols, and pilot symbols, respectively. A modulator (MOD) 1316a may perform OFDM modulation and provide output chips. A transmitter (TMTR) 1318a may conditions (e.g., convert to analog, amplify, filter, and upconvert) the output chips and generate a forward link signal, which may be transmitted via an antenna 1320a.

Sector 112 may similarly process traffic data and signaling for the terminals served by sector 112. The data, signaling, and pilot may be processed by a transmit processor 1314b, modulated by a modulator 1316b, conditioned by a transmitter 1318b, and transmitted via an antenna 1320b.

At terminal 120, an antenna 1352 may receive the forward link signals from sectors 110 and 112 and possibly other sectors. A receiver (RCVR) 1354 may condition (e.g., filter, amplify, downconvert, and digitize) a received signal from antenna 1352 and provide samples. A demodulator (DE-MOD) 1356 may perform OFDM demodulation and provide symbol estimates. A receive processor 1358 may process (e.g., symbol demap, deinterleave, and decode) the symbol estimates, provide decoded data to a data sink 1360, and provide decoded signaling (e.g., PC commands, PQIs, erasure indicators, RoT, IoT, etc.) to a controller/processor 1370.

On the reverse link, a transmit processor 1382 may receive and process traffic data from a data source 1380 and signaling (e.g., CQI values, ACKs, etc.) from controller/processor 1370. A modulator 1384 may perform OFDM modulation for OFDMA channels and CDMA modulation for pilot and CDMA channels and may provide output chips for all channels. A transmitter 1386 may condition the output chips and generate a reverse link signal, which may be transmitted via antenna 1352.

At each sector, the reverse link signals from terminal 120 and other terminals may be received by antenna 1320, conditioned by a receiver 1340, demodulated by a demodulator 1342, and processed by a receive processor 1344. Processor 1344 may provide decoded data to a data sink 1346 and decoded signaling to controller/processor 1330. At RL serving sector 110, demodulator 1342a may estimate the pilot quality for terminal 120 and may provide this information to controller/processor 1330a. Controller/processor 1330a may generate PC commands, PQIs, and/or other parameters for terminal 120, as described above. At FL serving sector 112, receive processor 1344b may determine the CQI metric for terminal 120 and may provide this information to controller/processor 1330b. Controller/processor 1330b may generate erasure indicators and/or other parameters for terminal 120, as described above.

Controllers/processors 1330a, 1330b and 1370 may direct the operation at sectors 110 and 112 and terminal 120, respectively. Memories 1332a, 1332b and 1372 may store data and program codes for sectors 110 and 112 and terminal 120, respectively. Schedulers 1334a and 1334b may schedule terminals communicating with sectors 110 and 112, respectively, and may assign channels and/or time frequency resources to the terminals.

The processors in FIG. 13 may perform various functions for the techniques described herein. For example, processor 1330a and/or 1334a may implement some or all of units 310 through 330 in FIG. 3 for RL serving sector 110. Processor 1330b and/or 1334b may implement some or all of units 410 through 430 in FIG. 4 for FL serving sector 112. Processor 1358, 1370 and/or 1382 may implement some or all of units 340 through 356 in FIGS. 3 and 4 for terminal 120. These processors may also perform some or all of the processing in FIGS. 5 through 12.

The techniques described herein may be implemented by various means. For example, these techniques may be implemented in hardware, firmware, software, or a combination thereof For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 1332a, 1332b, or 1372 in FIG. 13) and executed by a processor (e.g., processor 1330a, 1330b, or 1370). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
    at least one processor configured to receive feedback for a first transmission sent on a reverse link, to adjust a reference power level based on the feedback, to receive interference information for a sector, and to determine transmit power for a second transmission being sent to the sector based on the interference information for the sector and the reference power level; and
    a memory coupled to the at least one processor.

2. The apparatus of claim 1, wherein the interference information comprises at least one of a rise over thermal ratio (RoT) and an interference over thermal ratio (IoT).

3. The apparatus of claim 1, wherein the at least one processor is configured to send pilot as the first transmission on the reverse link, to receive a power control (PC) command for the pilot as the feedback, to adjust transmit power for the pilot based on the PC command, and to use the transmit power for the pilot as the reference power level.

4. The apparatus of claim 3, wherein the sector is a reverse link serving sector, and wherein the at least one processor is configured to receive the PC command from the sector and to send the second transmission to the sector.

5. The apparatus of claim 3, wherein the sector is a forward link serving sector, and wherein the at least one processor is configured to receive the PC command from a reverse link serving sector and to send the second transmission to the forward link serving sector.

6. The apparatus of claim 1, wherein the at least one processor is configured to send a channel quality indicator (CQI) as the first transmission on the reverse link, to receive an erasure indicator for the CQI as the feedback, to adjust transmit power for the CQI based on the erasure indicator, and to use the transmit power for the CQI as the reference power level.

7. The apparatus of claim 1, wherein the at least one processor is configured to receive a rise over thermal ratio (RoT) from the sector and to determine the transmit power for the second transmission based on the RoT and the reference power level.

8. The apparatus of claim 7, wherein the at least one processor is configured to send the second transmission at the determined transmit power with Code Division Multiple Access (CDMA).

9. The apparatus of claim 1, wherein the at least one processor is configured to receive an interference over thermal ratio (IoT) from the sector and to determine the transmit power for the second transmission based on the IoT and the reference power level.

10. The apparatus of claim 9, wherein the at least one processor is configured to send the second transmission at the determined transmit power with Orthogonal Frequency Division Multiple Access (OFDMA).

11. The apparatus of claim 1, wherein the at least one processor is configured to determine the transmit power for the second transmission further based on an offset factor for a channel used to send the second transmission.

12. The apparatus of claim 11, wherein the offset factor is set to achieve a target performance for the channel.

13. The apparatus of claim 1, wherein the at least one processor is configured to determine the transmit power for the second transmission further based on a boost factor for the second transmission.

14. The apparatus of claim 13, wherein the boost factor is dependent on type of information being sent in the second transmission and is set higher if the second transmission carries handoff information.

15. A method comprising:
    receiving feedback for a first transmission sent on a reverse link;
    adjusting a reference power level based on the feedback;
    receiving interference information for a sector; and
    determining transmit power for a second transmission being sent to the sector based on the interference information for the sector and the reference power level.

16. The method of claim 15, wherein the first transmission is for pilot, wherein the feedback comprises a power control (PC) command for the pilot, and wherein the adjusting the reference power level comprises
    adjusting transmit power for the pilot based on the PC command, and
    using the transmit power for the pilot as the reference power level.

17. The method of claim 15, wherein the first transmission is for a channel quality indicator (CQI), wherein the feedback comprises an erasure indicator for the CQI, and wherein the adjusting the reference power level comprises
    adjusting transmit power for the CQI based on the erasure indicator, and
    using the transmit power for the CQI as the reference power level.

18. The method of claim 15, wherein the interference information comprises a rise over thermal ratio (RoT), wherein the transmit power for the second transmission is determined based on the RoT and the reference power level, and wherein the method further comprises:
    sending the second transmission at the determined transmit power with Code Division Multiple Access (CDMA).

19. The method of claim 15, wherein the interference information comprises an interference over thermal ratio (IoT), wherein the transmit power for the second transmission is determined based on the IoT and the reference power level, and wherein the method further comprises:
    sending the second transmission at the determined transmit power with Orthogonal Frequency Division Multiple Access (OFDMA).

20. The method of claim 15, wherein the determining the transmit power for the second transmission comprises
    determining the transmit power for the second transmission further based on at least one of an offset factor for a channel used to send the second transmission and a boost factor for the second transmission.

21. An apparatus comprising:
    means for receiving feedback for a first transmission sent on a reverse link;
    means for adjusting a reference power level based on the feedback;
    means for receiving interference information for a sector; and means for determining transmit power for a second transmission being sent to the sector based on the interference information for the sector and the reference power level.

22. The apparatus of claim 21, wherein the interference information comprises a rise over thermal ratio (RoT), wherein the transmit power for the second transmission is determined based on the RoT and the reference power level, and wherein the apparatus further comprises:
  means for sending the second transmission at the determined transmit power with Code Division Multiple Access (CDMA).

23. The apparatus of claim 21, wherein the interference information comprises an interference over thermal ratio (IoT), wherein the transmit power for the second transmission is determined based on the IoT and the reference power level, and wherein the apparatus further comprises:
  means for sending the second transmission at the determined transmit power with Orthogonal Frequency Division Multiple Access (OFDMA).

24. The apparatus of claim 21, wherein the means for determining the transmit power for the second transmission comprises
  means for determining the transmit power for the second transmission further based on at least one of an offset factor for a channel used to send the second transmission and a boost factor for the second transmission.

25. A non-transitory processor-readable medium including instructions stored thereon, comprising:
  a first instruction set for receiving feedback for a first transmission sent on a reverse link;
  a second instruction set for adjusting a reference power level based on the feedback;
  a third instruction set for receiving interference information for a sector; and
  a fourth instruction set for determining transmit power for a second transmission being sent to the sector based on the interference information for the sector and the reference power level.

26. The non-transitory processor-readable medium of claim 25, wherein the interference information comprises a rise over thermal ratio (RoT), wherein the transmit power for the second transmission is determined based on the RoT and the reference power level, and wherein the processor-readable medium further comprises:
  a fifth instruction set for generating the second transmission at the determined transmit power with Code Division Multiple Access (CDMA).

27. The non-transitory processor-readable medium of claim 25, wherein the interference information comprises an interference over thermal ratio (IoT), wherein the transmit power for the second transmission is determined based on the IoT and the reference power level, and wherein the processor-readable medium further comprises:
  a fifth instruction set for generating the second transmission at the determined transmit power with Orthogonal Frequency Division Multiple Access (OFDMA).

28. The non-transitory processor-readable medium of claim 25, wherein the fourth instruction set is further for determining the transmit power for the second transmission further based on at least one of an offset factor for a channel used to send the second transmission and a boost factor for the second transmission.

29. An apparatus comprising:
  at least one processor configured to receive a first transmission from a terminal on a reverse link, to generate feedback based on the first transmission, to estimate interference at a sector and obtain interference information for the sector, to send the feedback and the interference information to the terminal, and to receive a second transmission sent by the terminal to the sector at a transmit power determined based on the feedback and the interference information for the sector; and
  a memory coupled to the at least one processor.

30. The apparatus of claim 29, wherein the at least one processor is configured to receive pilot as the first transmission from the terminal, to generate a power control (PC) command based on the received pilot, and to send the PC command as the feedback to the terminal 31. The apparatus of claim 29, wherein the at least one processor is configured to receive pilot as the first transmission from the terminal, to determine a pilot carrier-over-thermal ratio (PCoT) based on the received pilot, to generate a power control (PC) command based on the PCoT, and to send the PC command as the feedback to the terminal.

32. The apparatus of claim 29, wherein the at least one processor is configured to receive pilot as the first transmission from the terminal, to determine a pilot carrier-to-interference ratio (C/I) based on the received pilot, to generate a power control (PC) command based on the pilot C/I, and to send the PC command as the feedback to the terminal.

33. The apparatus of claim 29, wherein the at least one processor is configured to receive signaling as the first transmission from the terminal, to generate an erasure indicator based on the received signaling, and to send the erasure indicator as the feedback to the terminal.

34. The apparatus of claim 29, wherein the at least one processor is configured to estimate a rise over thermal ratio (RoT) at the sector, to send the interference information comprising the RoT, and to perform Code Division Multiple Access (CDMA) demodulation for the second transmission from the terminal.

35. The apparatus of claim 29, wherein the at least one processor is configured to estimate an interference over thermal ratio (IoT) at the sector, to send the interference information comprising the IoT, and to perform Orthogonal Frequency Division Multiple Access (OFDMA) demodulation for the second transmission from the terminal.

36. The apparatus of claim 29, wherein the at least one processor is configured to determine an offset factor for a channel used to send the second transmission and to send the offset factor to the terminal, and wherein the transmit power for the second transmission is determined further based on the offset factor.

37. The apparatus of claim 29, wherein the at least one processor is configured to determine a boost factor for the second transmission and to send the boost factor to the terminal, and wherein the transmit power for the second transmission is determined further based on the boost factor.

* * * * *